Feb. 3, 1970 T. DOMBROWSKI 3,492,708

TOOL SUPPORTING ASSEMBLY

Filed Dec. 22, 1966 4 Sheets-Sheet 1

INVENTOR:
Theodor DOMBROWSKI

BY
Michael J. Striker
his ATTORNEY

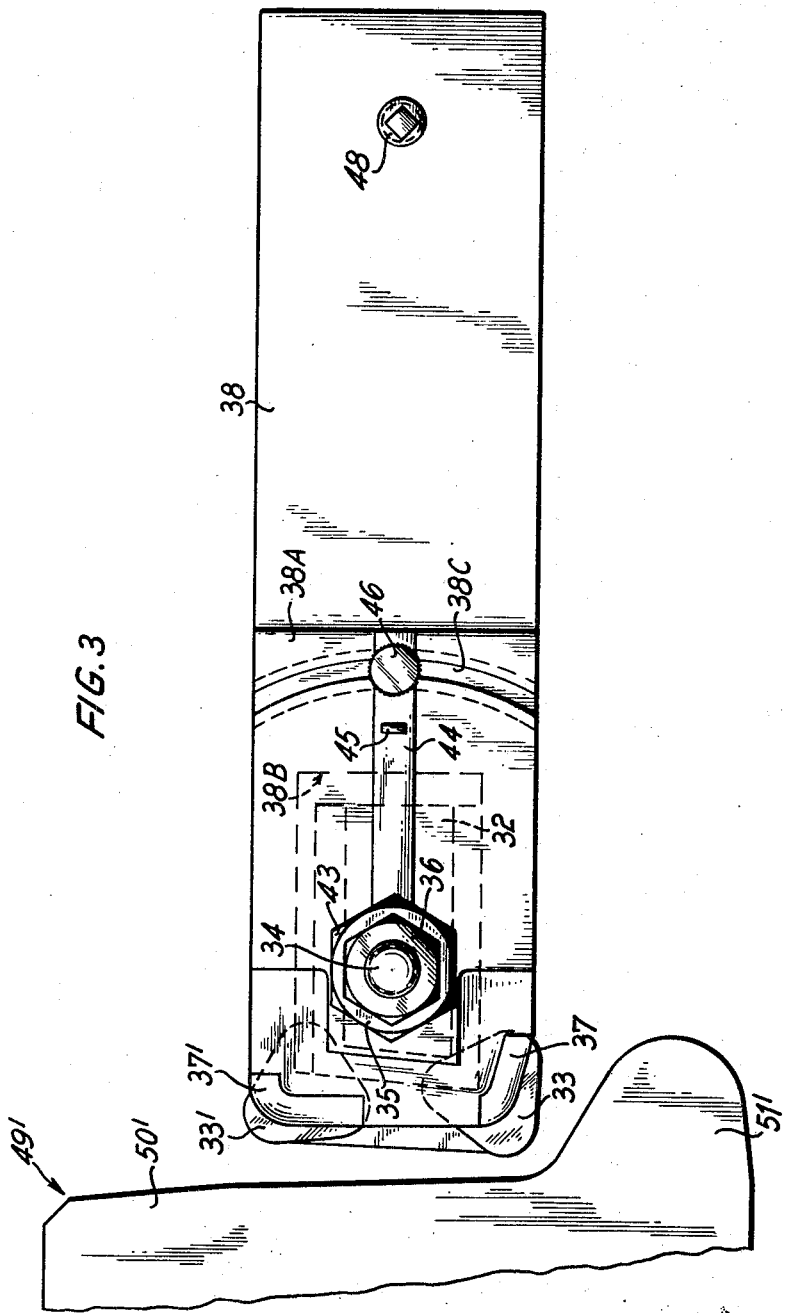

Feb. 3, 1970   T. DOMBROWSKI   3,492,708
TOOL SUPPORTING ASSEMBLY
Filed Dec. 22, 1966   4 Sheets-Sheet 4
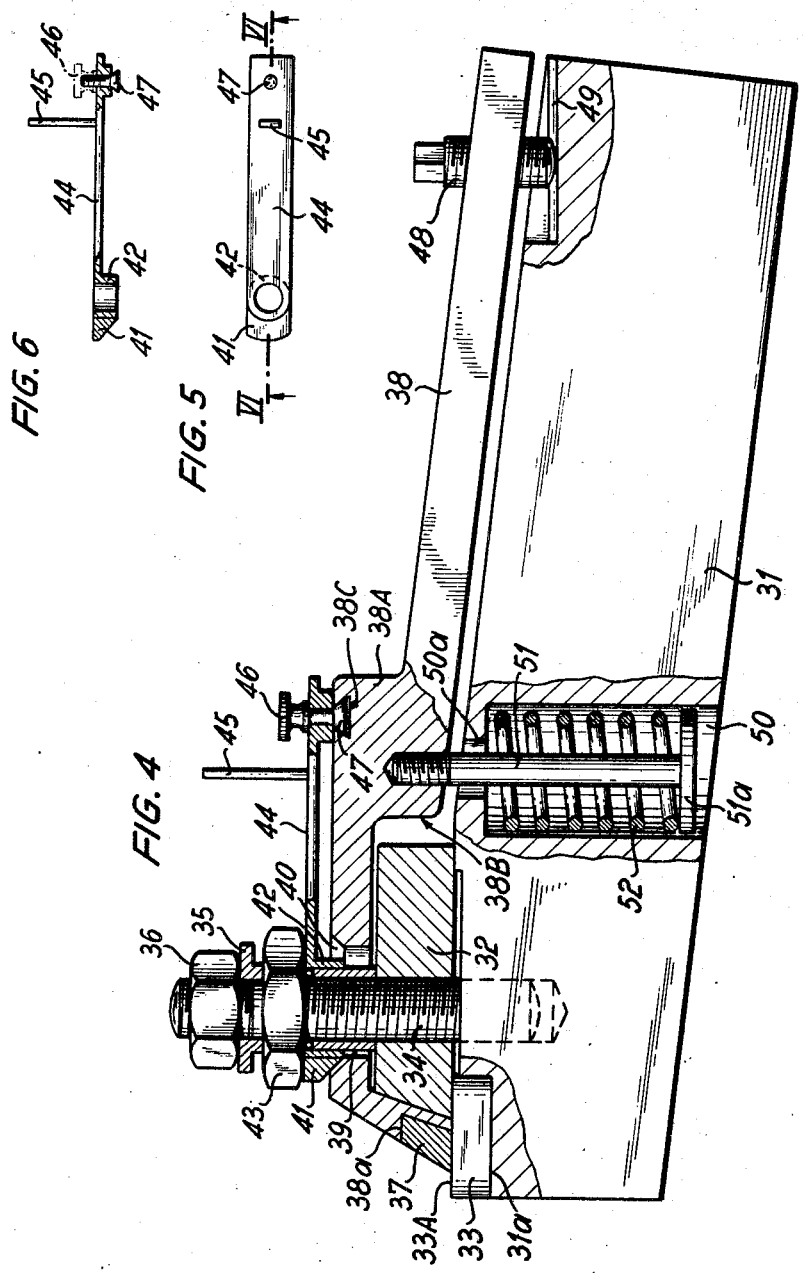
INVENTOR:
Theodor DOMBROWSKI
BY
Michael J. Striker
his ATTORNEY United States Patent Office 3,492,708
Patented Feb. 3, 1970

3,492,708
TOOL SUPPORTING ASSEMBLY
Theodor Dombrowski, Erkelenz, Rhineland, Germany, assignor to Wilhelm Hegenscheidt Kommanditgesellschaft, Erkelenz, Rhineland, Germany
Filed Dec. 22, 1966, Ser. No. 604,049
Claims priority, application Germany, Dec. 24, 1965, H 58,072; Jan. 7, 1966, H 58,163
Int. Cl. B26d 1/00
U.S. Cl. 29—96
17 Claims

ABSTRACT OF THE DISCLOSURE

A tool supporting assembly, particularly for use in lathes for machining back to its original contour the flange and rim of a multiple-wear railroad wheel. Comprises a tool holder which carries two turning tools, a lever which is biased against the tool holder and carries two chip breakers each of which abuts against the cutting face of one of the turning tools, and an adjusting device which can move the lever and the chip breakers with reference to the tool holder to change the position of chip breakers in order to account for differences in thickness of chips or shavings. The lever and its chip breakers are movable longitudinally and transversely of the tool holder.

CROSS-REFERENCES TO RELATED APPLICATIONS

Tool supporting assemblies of the present invention can be utilized in machines of the type disclosed in my copending applications Ser. No. 440,170 (entitled "Wheel Set Turning Lathes"), 525,527 (entitled "Machine for Treating Wheels of Railroad Vehicles") and 529,336 (entitled "Machine for Treating Wheels of Railroad Vehicles"). Another machine which may utilize the tool supporting assembly of the present invention is disclosed in my Letters Patent No. 3,203,286, granted Aug. 31, 1965 for "Underfloor Lathe for Reconditioning Railway Vehicle Wheels."

BACKGROUND OF THE INVENTION

The present invention relates to improvements in tool supporting assemblies, particularly to improvements in assemblies which can support turning tools for use in lathes for reconditioning of multiple-wear railroad vehicle wheels.

In machining or reconditioning of metallic parts, particularly those consisting of steel and iron, the high tensile strength of such material results in the production of continuous chips or shavings which are not only dangerous to workmen but also occupy too much space. If the chips are not broken up, the pans, trays and/or other types of chip-collecting receptacles must be evacuated at frequent intervals because a coiled chip takes up much more space than a pile of fragments obtained in response to breaking of a continuous chip.

Heretofore known chip breakers are either integral with the material-removing tools or are formed as separate bodies which are mounted on the material-removing tools. For example, it is known to provide the cutting face of a tool with a groove or depression which deflects the chip against an uncut portion of the workpiece and causes the chip to break into small pieces. If the chip breaker is a discrete piece of metallic material, it is normally clamped or brazed to the top of the tool.

Serious problems arise when the chip formation depends from several variable factors, particularly in lathes for reconditioning of multiple-wear railroad vehicle wheels. In such machines, the distance between the chip breaker and the cutting edge of the tool must be adjusted, at least from time to time, to account for changes in the thickness and/or consistency of chips. As a rule, a tool holder which is used in wheel turning lathes carries two tools one of which treats the rim and one side of the flange and the other of which treats the other side of the flange. The degree of wear upon the rims and flanges varies, not only on different wheels but also on circumferentially spaced portions of a single wheel. Thus, and depending on the extent of wear, the tools must be adjusted to remove thicker or thinner shavings, and the thickness of shavings varies along the circumference and also in the axial direction of the wheel. Furthermore, the material of a railroad vehicle wheel is not homogeneous. Such material hardens by cold-forming when the wheel is in actual use and the hardening is uniform only if the starting material is homogeneous in each region of the wheel. The variations in hardness are more pronounced in wheels which have undergone repeated reconditioning treatment in a turning lathe. Differences in hardness are also due to the fact that certain portions of the flanges and/or rims exhibit so-called flats which develop on repeated sliding along the rails in response to the application of brakes. The material which is adjacent to such flats is often so hard that the thickness of chips during turning must be reduced to a minimum in order to avoid excessive wear on the turning tools. All of the above enumerated factors affect the thickness of chips and, therefore, the action of chip breakers. It is practically impossible to predict the exact thickness of chips so that a chip breaker which is rigid with the tool or forms an integral part of the tool is of little use in reconditioning of multiple-wear wheels for railroad vehicles.

Attempts to overcome the drawbacks of presently known chip breakers in connection with treatment of multiple-wear wheels include the provision of small chip breakers which are slidable in grooves machined into the faces of turning tools. Such mounting enables the operator to adjust the position of the chip breaker when the machine is in actual use. The size of presently known adjustable chip breakers is very small because they must be mounted in relatively small turning tools. Moreover, the grooves or ways for such chip breakers are immediately adjacent to the cutting edges so that they accumulate fragments of chips and dust to prevent further movements of chip breakers. The wear on the material surrounding the grooves is very high and, furthermore, it is not possible to install the tool in two or more different positions. To my knowledge, such slidable chip breakers were never employed on tool holders with twin turning tools wherein the provision of properly positioned chip breakers is of utmost importance.

Accordingly, it is an important object of my invention to provide a simple tool supporting assembly with one or more turning or like material-removing tools which is provided with one or more chip breakers and is constructed and assembled in such a way that each chip breaker can be placed into an optimum position with reference to the associated tool and wherein such mounting of chip breakers does not affect the rigidity and/or the versatility of tools.

Another object of the invention is to provide a novel mounting for the carrier of one or more chip breakers in a tool supporting assembly of the just outlined character.

A further object of the invention is to provide a tool supporting assembly with one or more chip breakers wherein the part or parts which carry the chip breakers are not likely to accumulate dust, fragments of chips and/or other foreign matter.

An additional object of the instant invention is to provide a tool supporting assembly wherein the tools and/or the chip breakers can be interchanged, reoriented and/or replaced with little loss in time and wherein the chip breakers are adjustable in one, two or more directions with reference to the associated tools.

A concomitant object of the invention is to provide a novel adjusting device for chip breakers and their carrier means which may be utilized in the above outlined tool supporting assembly.

A further object of the invention is to provide a tool supporting assembly which can be used in many presently known types of turning lathes or like material-removing machines.

An additional object of the invention is to provide a tool supporting assembly wherein the position of one or more chip breakers can be adjusted when the assembly is in actual use in a turning lathe or another material-removing machine.

An ancillary object of the invention is to provide a turning lathe which embodies the improved tool supporting assembly and to construct the assembly in such a way that all of its chip breakers can be adjusted in a single operation.

SUMMARY OF THE INVENTION

The invention resides in the provision of a tool supporting assembly which is especially suited to support turning tools for treatment of multiple-wear railroad vehicle wheels.

In its simplest form, the tool supporting assembly comprises a tool holder, a turning tool mounted in a recess at one end of the tool holder, a carrier which is preferably constituted by a lever adjacent to one side of the tool holder, a chip breaker mounted in a recess provided in one end portion of the carrier adjacent to the turning tool, biasing means operating between the tool holder and carrier to urge the chip breaker against the turning tool, and an adjusting device for moving the carrier in a plurality of directions with reference to the tool holder to change the position of the chip breaker with reference to the turning tool.

In accordance with a presently preferred embodiment of my invention, the tool holder supports two turning tools and the carrier supports two chip breakers each of which is caused to bear against the top face of one of the turning tools.

The adjusting device preferably comprises means for moving that end portion of the carrier which supports the chip breakers longitudinally and transversely of the tool holder.

The novel features which are considered as characteristic of the invention are set forth in particular in the appended claims. The improved tool supporting assembly itself, however, both as to its construction and its mode of operation, together with additional features and advantages thereof, will be best understood upon perusal of the following detailed description of certain specfic embodiments with reference to the accompanying drawing.

SHORT DESCRIPTION OF THE DRAWING

FIG. 3 is a top plan view of a second tool supporting assembly;

FIG. 4 is a side elevational view of the second assembly with portions of the tool holder and carrier shown in section;

FIG. 5 is a smaller-scale top plan view of a rocking member which is utilized in the assembly of FIGS. 3 and 4; and FIG. 6 is a section as seen in the direction of arrows from the line VI–VI of FIG. 5.

DESCRIPTION OF THE PREFERRED EMBODIMENTS

Figure 1:
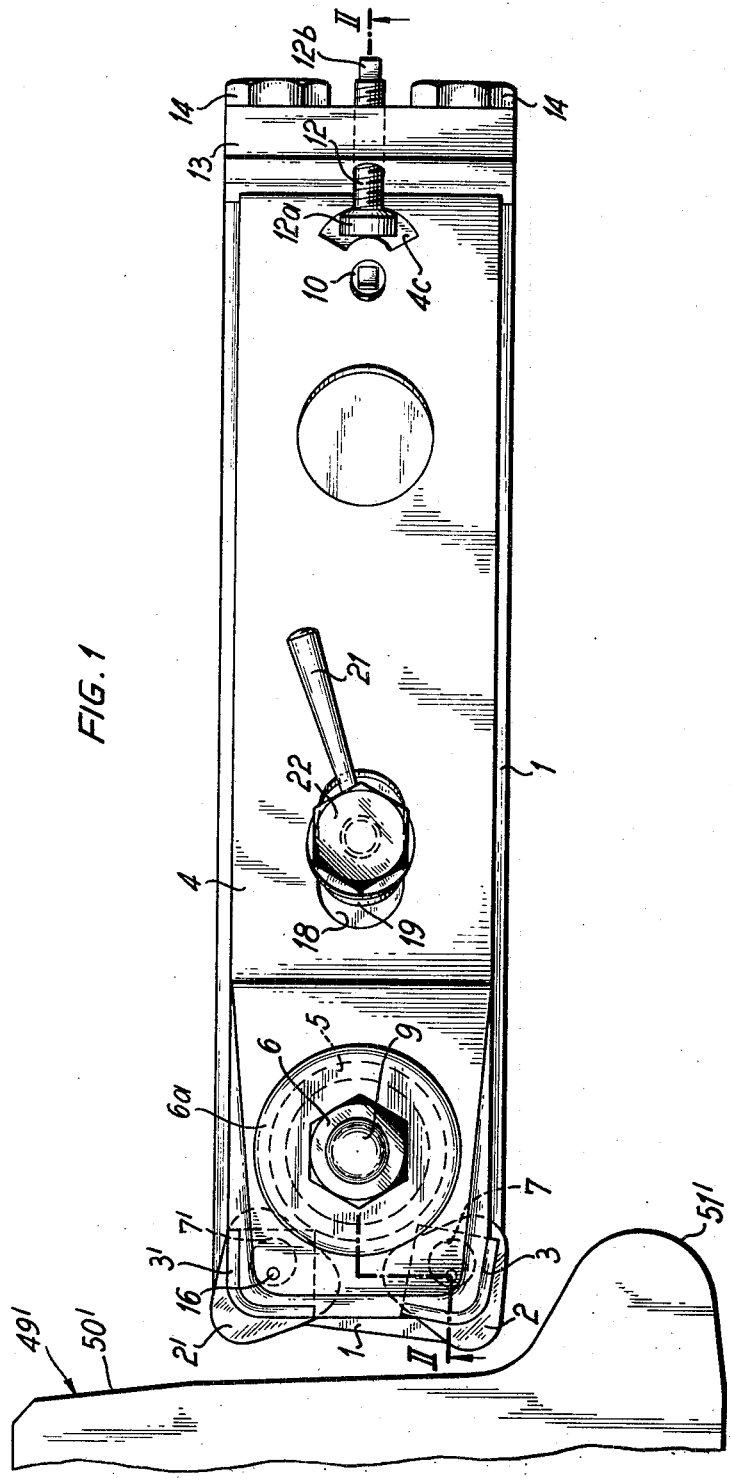
FIG. 1 is a top plan view of a tool supporting assembly with two turning tools and two chip breakers which embodies one form of my invention.
Figure 2:
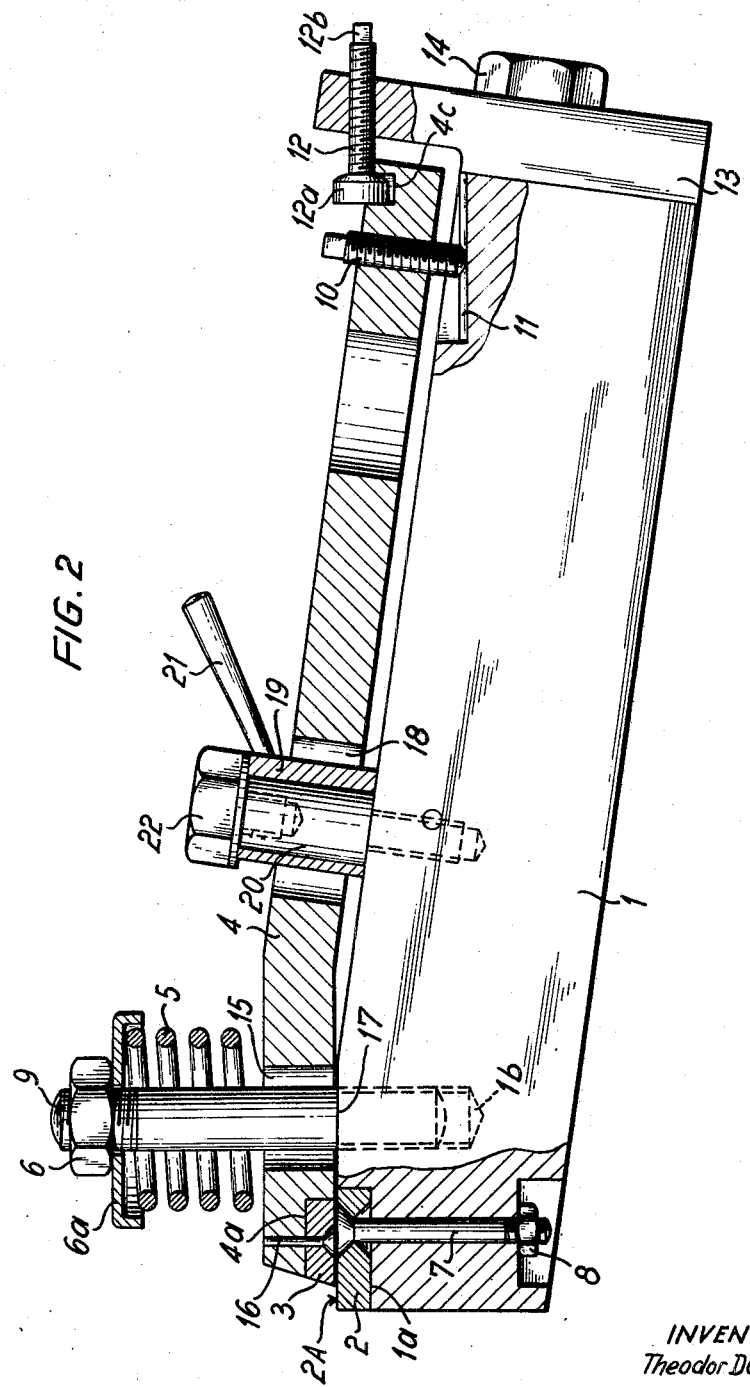
FIG. 2 is a side elevational view of the tool supporting assembly with a portion of the tool holder broken away and with the carrier for chip breakers shown in section taken along the line II—II of FIG. 1.

Referring first to FIGS. 1 and 2, there is shown a tool supporting assembly which is utilized in a lathe for machining back to its original contour the rim 50 and flange 51 of a multiple-wear railroad vehicle wheel 49. Such lathes are disclosed, for example, in my aforementioned copending applications Ser. Nos. 440,170, 525,527 and 529,336.

The tool supporting assembly comprises an elongated plate-like tool holder 10, one end portion of which is provided with recesses 1a (only one shown) for two turning tools 2, 2' here shown as bits which are removable from their respective recesses and are clamped in position by bolts 7, 7' and nuts 8. The bolts 7, 7' urge the tools 2, 2' flat against the surfaces bounding the respective recesses 1a and the nuts 8 are accessible from that side of the tool holder 1 which faces away from the tools.

The tools 2, 2' have exposed top faces or cutting faces 2A which are adjacent to two interchangeable chip breakers 3, 3' mounted in recesses 4a provided therefor in the left-hand end portion of an elongated carrier 4 here shown as a lever which overlies the upper side of the tool holder 1 and is biased against the tool holder to maintain the chip breakers 3, 3' in abutment with the respective top faces 2A. The means for detachably securing the chip breakers 3, 3' to the left-hand end portion of the lever 4 comprises splined pins 16 or analogous fasteners of known design.

The biasing means for urging the chip breakers 3, 3' against the top faces 2A of the tools 2, 2' comprises a post 9 which is screwed into a tapped bore 1b of the tool holder 1 and extends with clearance through an opening 15 provided in the left-hand end portion of the lever 4. The post 9 is surrounded by a helical spring 5 which bears against the exposed side of the lever 4 and whose bias may be adjusted by a nut 6 which meshes with the post 9 and controls the axial position of a cupped retainer 6a.

The recesses 1a are machined into the left-hand end portion 17 of the top surface of the tool holder 1 and such portion 17 is inclined with reference to the longitudinal direction of the tool holder. The angle of inclination of the portion 17 corresponds to the negative back rake angle.

The adjusting device which can move the left-hand end portion of the lever 4 in a plurality of directions, particularly lengthwise and transversely of the tool holder 1, comprises an externally threaded pivot member 10 which meshes with and extends through the right-hand end portion of the lever 4 so that its tip can slide in an elongated channel or groove 11 machined into the upper side of the tool holder 1. The channel 11 extends lengthwise of the tool holder 1 and its inclination is identical with or similar to that of the surface portion 17. The pin 10 enables the left-hand end portion of the lever 4 and the chip breakers 3, 3' to travel in an arc about the axis of the pin 10.

The adjusting device further comprises a shifting bolt 12 which is in mesh with a bracket 13 secured to the right-hand end face of the tool holder 1 by screws 14. The head 12a of the bolt 12 extends into a notch 4c provided in the right-hand end portion of the lever 4. By rotating the non-circular end 12b of the bolt 12, the operator can move the lever 4 lengthwise whereby the tip of the pivot pin 10 slides in the channel 11. The bracket 13 may constitute an integral part of the tool holder 1. The axis of the bolt 12 is inclined in the same way as the channel 11.

The aforementioned adjusting device further comprises rocking means for pivoting the lever 4 about the pin 10. Such rocking means comprises a shaft 20 one end of which is screwed into the tool holder 1 in a region intermediate the post 9 and pivot pin 10. The shaft 20 has a cylindrical peripheral surface which is surrounded by an annular eccentric 19 provided with a handgrip member 21 and held against axial movement by a bolt 22 which is screwed into the upper end of the shaft 20. The eccentric 19 extends with negligible lateral clearance into an elongated slot 18 machined into an intermediate portion of the lever 4. Thus, when the operator turns the member 21, the lever 4 will be caused to pivot about the axis of the pin 10. Such pivotal movement is possible because the opening 15 receives the post 9 with sufficient clearance and because the head 12a is also received with some clearance in the notch 4c of the lever 4.

It will be seen that the lever 4 is adjustable lengthwise of the tool holder 1 (by means of the shifting bolt 12), and that the left-hand end portion of the lever and the chip breakers 3, 3' are pivotable or rockable on the pin 10 in response to angular displacement of the eccentric 19. In this way, the operator can locate the chip breakers in a desired position with reference to the tools 2, 2'. Furthermore, the chip breakers and the tools are readily accessible upon removal of nut 6 and eccentric 19. The adjustments of the chip breakers 3, 3' are very small and their extent depends on the thickness of chips or shavings.

The chip breakers 3, 3' are preferably of identical size and shape and can be used interchangeably. This reduces the manufacturing cost and simplifies the storage of spare chip breakers. Each chip breaker is preferably provided with two breaking or cutting faces and is in large surface-to-surface contact with the lever 4 so that the latter can take up stresses which arise when the chip breakers are in actual use and are engaged by successive increments of chips. The entire assembly is very simple and fragments of chips cannot interfere with adjustments of the lever 4.

Longitudinal adjustment of the lever 4 by means of the shifting bolt 12 requires the exertion of a relatively small force because the area of frictional engagement between the pivot pin 10 and tool holder 1 is small and because the spring 5 yields and permits the chip breakers to slide along the top faces 2A of the tools 2, 2'. The extent of friction is proportional to the pressure between the tool holder 1 and lever 4. Friction between the pin 10 and tool holder 1 is rather small because the arm of the lever 4 between such pin and the post 9 is long.

Since the chip breakers 3, 3' are rigid with the lever 4, a single adjusting device suffices to effect simultaneous changes in the position of both chip breakers. Such mounting of chip breakers contributes to greater compactness, stability and reasonable manufacturing cost of the tool supporting assembly.

FIGS. 3 and 4 illustrate a second tool supporting assembly including an elongated plate-like tool holder 31 having at its left-hand end two recesses 31a for interchangeable turning tools 33, 33'. These tools are held in their recesses by a clamping plate 32 which overlies portions of their top faces 33A and is pressed against the upper side of the tool holder 31 by an elongated cylindrical sleeve 35 surrounding a post 34 which meshes with the tool holder and extends with no clearance through a bore of the clamping plate. The sleeve 35 is pressed against the outer side of the clamping plate 32 by a nut 36 which meshes with the outer end of the post 34. The sleeve 35 is provided with external threads and meshes with a lock nut 43 forming part of a modified adjusting device for an elongated carrier or lever 38. The left-hand end portion of the lever 38 is provided with recesses 38a for two chip breakers 37, 37' which respectively abut against the top faces 33A of the tools 33, 33'. In this embodiment of my invention, the chip breakers 37, 37' are soldered or brazed to the lever 38.

The biasing means for urging the chip breakers 37, 37' against the tools 33, 33' comprises a guide rod 51 which meshes with the lever 38 and extends with clearance through a slot 50a and into a chamber 50 of the tool holder 31. The free end of the rod 51 carries a disk-shaped retainer 51a for a prestressed spring 52 which operates between the retainer and the bottom surface in the chamber 50. The bias of the spring 52 may be adjusted by rotating the rod 51 or by moving the retainer 51a axially of the rod. For example, the retainer 51a may be constituted by a nut which meshes with the rod 51. The rod 51 and retainer 51a can be said to form part of the lever 38 so that the spring 52 actually operates between this lever and the tool holder 31 to press the chip breakers 37, 37' against the respective top faces 33A.

The right-hand end portion of the lever 38 carries a pivot pin 48 which meshes therewith and extends into an elongated forwardly and downwardly inclined channel or groove 49 machined into the upper side of the tool holder 31. The channel 49 extends toward the left-hand end of the tool holder 31 and the inclination of its bottom surface is the same as that of the top faces 33A. The pivot member 48 and channel 49 form part of the adjusting device which enables the operator to move the substantially bell-shaped left-hand end portion 38A of the lever 38 in several directions. The end portion 38A has a side facing the tool holder 31 and provided with a recess or depression 38B which receives with clearance the clamping plate 32 to allow for adjustment of chip breakers 37, 38' longitudinally as well as transversely of the tool holder 31.

The end portion 38A is formed with an opening 39 of oval or other non-circular outline and bounded at its outer end by a surface 40 which tapers toward the tool holder 31. The opening 39 accommodates the sleeve 35 with substantial clearance and further receives a ring 42 at one end of a rocking member 44 which is shown separately in FIGS. 5 and 6. The ring 42 has a wedge-shaped follower 41 which is slidable along the tapering surface 40 to thereby rock the lever 38 about the axis of the pivot pin 48. The follower 41 can also move the lever 38 and pin 48 in the longitudinal direction of the channel 49 in the tool holder 31.

The rocking member 44 is provided with a handgrip portion 45 and carries a pin 47 whose head extends into an arcuate groove 38C machined into the exposed surface of the end portion 38A. When the operator tightens a knurled nut 46, the head of the pin 47 is locked to the lever 38 and the latter remains in the selected position of adjustment with reference to the tool holder 31. The operator then rotates the lock nut 43 to press the follower 41 against the surface 40.

An important advantage of the bell-shaped lever portion 38A is that it prevents entry of foreign matter into the space accommodating the clamping plate 32. The manipulation of the adjusting device shown in FIGS. 3 and 4 is simpler than that of the adjusting device shown in FIGS. 1 and 2 because of a single member (44) suffices to effect longitudinal and/or transverse adjustments of the chip breakers 37, 37'. Also, the clamping plate 32 can be reached and the tools 33, 33' reoriented, interchanged or replaced immediately upon removal of the nut 36.

The radii of curvature of cutting edges on the tools 2, 2' or 33, 33' are preferably smaller than the radii of curvature of cutting edges on the chip breakers 3, 3' or 37, 37'. The chip breakers are preferably constituted by small plates of hardened metallic material which are adapted to be mounted in a plurality of positions and are discarded when dull because the cost of grinding and honing exceeds the cost of a new chip breaker.

Chips moving beyond the cutting edges are strongly compressed so that their cross section exceeds the theoretical value based on the feed and depth of cut. The compression is particularly pronounced along the rounded portions of the tools where the chips interfere with each other and thus the chips removed by the rounded portions are especially wide. Therefore, and as clearly shown in FIGS. 1 and 3, the distance between the rounded portions of tools and the respective chip breakers exceeds the distance between the straight portions. This is achieved by the aforementioned relationship between the radii of curvature.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is:

1. A tool supporting assembly, especially for use in machining or tooling eccentric surfaces such as profiles of used railroad vehicle wheels in which the chip thickness changes while the wheel during its machining makes a full revolution, comprising a tool holder member; a tool mounted in said tool holder member; an elongated carrier mounted on said tool holder member for limited universal movement with respect thereto; a chip breaker mounted in said carrier adjacent said tool with one face of said chip breaker engaging the corresponding face of said tool; resilient biasing means operating between said tool holder and said carrier to urge the latter towards said tool holder member to thereby forceably press said face of said chip breaker against said corresponding face of said tool; and adjusting means for quickly moving said carrier against the force of said resilient biasing means in a plurality of positions relative to said tool holder member so that the position of said chip breaker relative to said tool may be quickly changed during machining of the wheel and before the latter makes a full revolution.

2. A tool supporting assembly as defined in claim 1, further comprising a second tool mounted in said tool holder member adjacent to said first mentioned tool and a second chip breaker mounted in said carrier adjacent to said second tool, said tools having top faces and said chip breakers being biased against such top faces of the respective tools.

3. A tool supporting assembly as defined in claim 2, wherein said carrier is constituted by a lever member having a first end portion supporting said chip breakers and a second end portion, and including a guide channel provided on one of said members adjacent to said second end portion and extending in a direction toward said first end portion, and a pivot pin mounted on the other of said members and slidable in said channel.

4. A tool supporting assembly as defined in claim 3, wherein said pivot pin is a screw meshing with the second end portion of said lever member.

5. A tool supporting assembly as defined in claim 3, wherein said lever member is turnable about said pivot pins.

6. A tool supporting assembly as defined in claim 3, wherein said adjusting means comprises rocking means for turning said lever member about said pivot pins.

7. A tool supporting assembly as defined in claim 6, wherein said lever member is provided with an elongated slot intermediate said end portions thereof and said rocking means comprises a shaft affixed to said tool holder member and an eccentric extending into said slot and rotatable on said shaft to thereby turn said lever member about said pivot pin.

8. A tool supporting assembly as defined in claim 3, further comprising shifting means for moving said lever member with reference to said tool holder member in the longitudinal direction of said channel.

9. A tool supporting assembly as defined in claim 2, wherein said biasing means comprises a post fixed to said tool holder member and extending with clearance through an opening provided in said carrier, a prestressed spring mounted on said post and bearing against the carrier to bias said chip breakers against the respective tools, and means for regulating the bias of said spring.

10. A tool supporting assembly as defined in claim 2, wherein said chip breakers are constituted by bits and wherein said bits are interchangeable.

11. A tool supporting assembly as defined in claim 2, wherein said tools and said chip breakers have arcuate cutting edges and the radii of curvature of cutting edges on said chip breakers exceed the radii of curvature of the cutting edges on said tools.

12. A tool supporting assembly as defined in claim 2, further comprising clamping means for retaining said tools in recesses provided therefor in said tool holder member, said carrier having an end portion provided with a recess receiving with clearance said clamping means and supporting said chip breakers.

13. A tool supporting assembly as defined in claim 2, wherein said adjusting means comprises a post mounted in said tool holder member and extending through an opening provided in said carrier, said opening being bounded by a surface having angularly spaced portions disposed at different distances from said post, and a rocking member rotatable on said post and abutting against said surface.

14. A tool supporting assembly as defined in claim 13, wherein said surface tapers toward said tool holder member and said rocking member has a handgrip portion and means for releasably fixing said handgrip portion to said carrier.

15. A tool supporting assembly as defined in claim 13, further comprising clamping means for retaining said tools in recesses provided therefor in said tool holder member, said carrier having an end portion surrounding with clearance said clamping means and supporting said chip breakers, said post extending through said clamping means, and further comprising a sleeve mounted on said post and extending through said opening and a nut meshing with said post and pressing said sleeve against said clamping means, said rocking member being rotatably telescoped onto said sleeve.

16. A tool supporting assembly as defined in claim 15, wherein said carrier has a second end portion and including a channel provided in said tool holder member adjacent to said second end portion and a pivot member fixed to said second end portion and slidably extending into said channel, said pivot member and said post having axes disposed in a common plane and said channel extending in a direction toward said post.

17. A tool supporting assembly as defined in claim 1, wherein said adjusting means comprise lever operated cam means engaging said carrier.

References Cited

UNITED STATES PATENTS

| | | | |
|---|---|---|---|
| 2,173,772 | 9/1939 | Timmons | 29—96 |
| 2,937,432 | 5/1960 | Novkov | 29—96 |
| 2,967,345 | 1/1961 | Novkov | 29—96 |
| 3,124,866 | 3/1964 | Novkov | 29—96 |
| 3,136,031 | 6/1964 | Cassidy | 29—97 |
| 3,171,188 | 3/1965 | Stier | 29—96 |
| 3,187,407 | 6/1965 | Ducet | 29—96 |

FOREIGN PATENTS

| | | |
|---|---|---|
| 604 | 10/1934 | Germany. |
| 1,857,320 | 5/1962 | Germany. |
| 60,931 | 8/1954 | France. |
| 956,473 | 8/1949 | France. |
| 1,041,370 | 5/1953 | France. |
| 1,271,621 | 8/1961 | France. |

HARRISON L. HINSON, Primary Examiner